Jan. 5, 1943.  S. PRZYBOROWSKI  2,307,298
RADIATOR CORE AND METHOD OF MAKING THE SAME
Filed Aug. 29, 1940  2 Sheets-Sheet 1

INVENTOR
Stanislaus Przyborowski
BY Albert R Henry
ATTORNEY

Jan. 5, 1943.    S. PRZYBOROWSKI    2,307,298
RADIATOR CORE AND METHOD OF MAKING THE SAME
Filed Aug. 29, 1940    2 Sheets-Sheet 2
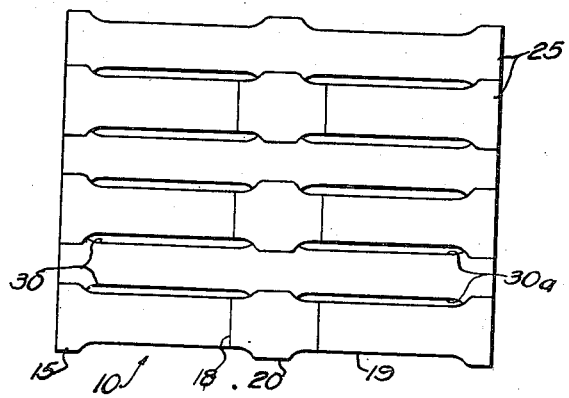
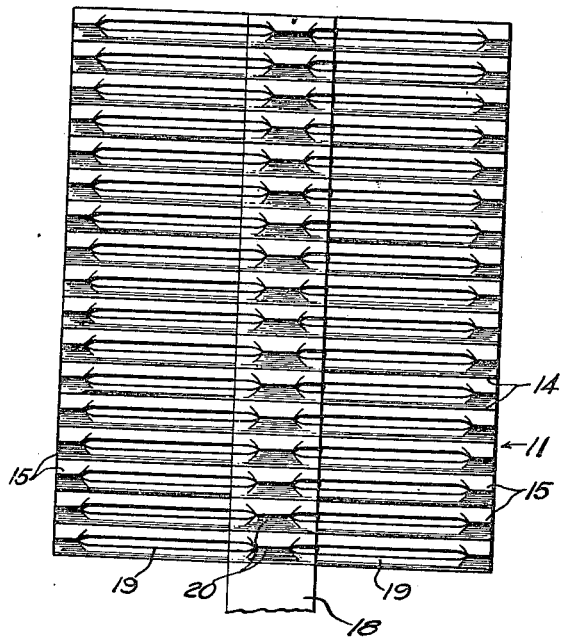
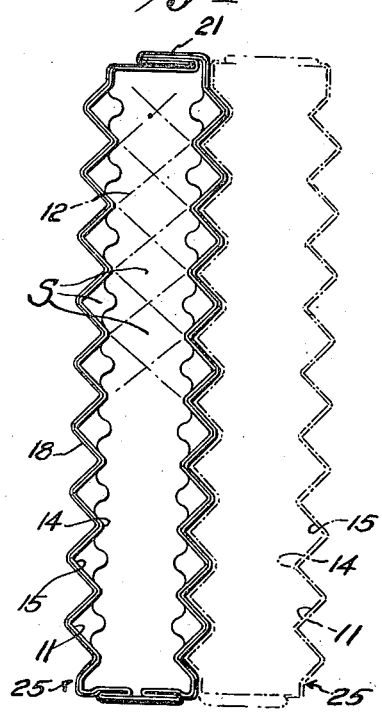
INVENTOR
Stanislaus Przyborowski
BY Albert R Henry
ATTORNEY Patented Jan. 5, 1943

2,307,298

UNITED STATES PATENT OFFICE 2,307,298

RADIATOR CORE AND METHOD OF MAKING THE SAME

Stanislaus Przyborowski, Tonawanda, N. Y., assignor to Fedders Manufacturing Company, Inc., Buffalo, N. Y.

Application August 29, 1940, Serial No. 354,686

5 Claims. (Cl. 113—118)

This invention relates to cellular radiator cores, and particularly to cores of the deep type.

It is proposed to provide a cellular core having two or more rows of water passages, which rows are isolated from each other by median soldered joints. This is accomplished by forming the outer ribbons with medial offset portions having inserts of cold ribbon solder of extreme thinness applied thereto during the deformation step of forming such ribbons. As a result, when the ribbons are assembled and solder dipped in the manner well known in the art, the relatively remotely located medial joints are soldered through the fusing of the solder inserts.

In practical use, cores of this novel type have been found to be ideal for automobile heaters, where deep cores of high efficiency are demanded in order to conserve space. The particular effectiveness of this core is attributed to the multi-row water passage structure which permits a counterflow circulation of hot water through the core, and in addition tremendously strengthens the core without appreciable addition of weight nor complexity of manufacture.

The invention is illustrated in the accompanying drawings, wherein:

Fig. 3 is a plan of a length of outer ribbon with the solder insert applied thereto;

Fig. 4 is an enlarged end view of an outer ribbon unit with an adjoining unit shown in dotted lines;

Fig. 5 is a top view of a grouping of ribbon units; and

Figure 1:
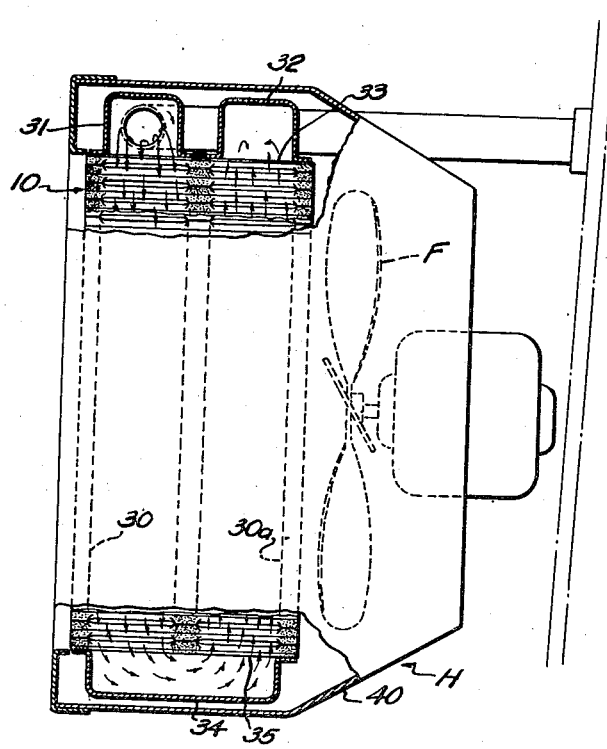
Fig. 1 is a side elevation of an automobile heater with portions broken away to show the core arrangement and flow circuit therein.

The radiator core 10, as will be seen in Figs. 3 to 5, is of the cellular type, being fabricated of so-called outer, or water line, ribbons 11 forming vertical water passages 30 and 30a in their assembled state, and inner or spacer ribbons 12 which provide horizontal fin surfaces in the air passage spaces S between the water passage portions of the ribbons.

The outer ribbons 11, with which the invention is particularly concerned, are formed with lineal regularly spaced inner crests 14 extending completely across the ribbon. Angular offset portions 15 are formed between the crests 14 on each marginal portion of the ribbon, and they present a zig-zag formation as viewed in end elevation (Fig. 4).

Figure 6:
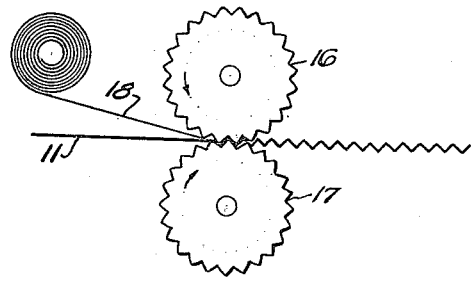
Fig. 6 is a diagrammatic view of a roller die during the process of forming the ribbon of Fig. 3.

On the median portion of the ribbons 11 there are offset portions 20, which in transverse section are substantial duplicates of the offset portions 15. The portions of the ribbon between the offset portions 15, 20 are deformed or partially flattened, as indicated by the numeral 19, to provide longitudinal channels. In the process of forming the ribbons, roller dies 16, 17 may be utilized, as illustrated in Fig. 6, wherein the roll stock is drawn through the continuously operating dies and the formed ribbon is finally cut into the desired lengths. A strip of ribbon solder 18 is simultaneously fed through the dies with the ribbon stock, and it is thus formed and applied to the central offset portions 20, so that the solder tightly adheres to the convolutions of the ribbon to form an insert, as shown in Fig. 3.

Subsequently the lengths of ribbon 11 are bent to form elongated enclosure units 25 (Fig. 4), with the offsets 15, 20 pointing outward, and with the ribbon terminals formed into an interlocking joint 21. Inner ribbons 12, of any suitable type, are inserted within the units 25, as indicated in dot and dash lines in Fig. 4. The completed units 25 are now stacked together to form a core section (Fig. 5), and, as is well known in the art, they are later face dipped in solder so that the contacting surfaces of adjoining outer and inner ribbons 11 and 12 are integrated.

During the dipping operation the solder inserts 18 are heated to a fusing temperature by heat conduction along the ribbons 11, and accordingly the central offsets 15 of adjoining outer ribbons 11 are securely bonded.

If desired, only alternate units 25 need be supplied with the solder inserts 18.

It will now be observed that in the completed core 10 there are provided two independent sets of water channels 30 and 30a, which are separated by the united offsets 15 of adjoining units 25.

Figure 2:
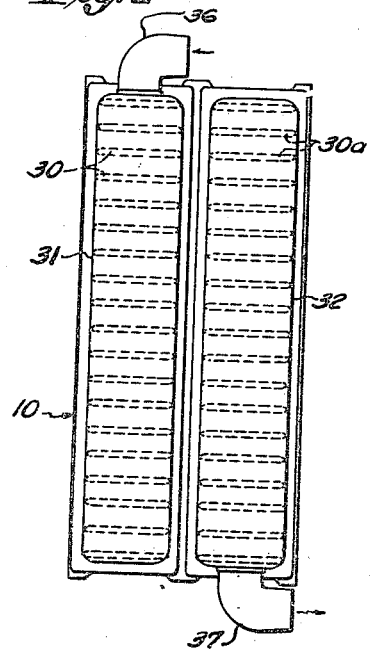
Fig. 2 is a top view of the core unit of the heater.

One of the numerous practical uses of this core is shown in Figs. 1 and 2, where it is used in an automobile heater H. Inlet and outlet tanks 31 and 32 are soldered to one end surface 33 of the core 10 to cover the extremities of the channels 30 and 30a, respectively. A single tank 34 covers the opposite extremities of the channels 30, 30a, and such tank is soldered to the end surface 35 of the core. The tanks 31 and 32 are supplied with fittings 36 and 37, to which are secured suitable conduits leading to hot water supply and discharge lines respectively of the automobile engine (not shown).

The heater H includes a casing 40 enclosing the core 10, which is suitably fastened thereto. The casing 40 also carries a motor driven fan F, which directs an air stream through the core 10.

It will be apparent that during operation of the heater, hot water entering the tank 31 will be directed downward through the channels 30 and into the tank 34, whence the water is directed upward through the channels 30a to the outlet tank 32. This counterflow circuit has been found to be highly effective in automobile heater use, especially in cases where deep cores are demanded.

It is not intended that the invention be limited to the specific type of cellular ribbon herein illustrated, nor to the circuit shown in Figs. 1 and 2, as it will be understood by those skilled in the art that the invention may be used in numerous other manners without departing from the inventive concept as set forth in the accompanying claims.

I claim:

1. In a radiator, a cellular core including outer ribbons having aligned marginal and medial offset portions adapted to contact corresponding portions on adjacent ribbons to define a double row of water passages, means for integrating the ribbons at contacting points to form a core structure, a pair of tanks secured to one end face of the core structure, each tank covering a row of water passages, a single tank secured to the remaining end face of the core and enclosing the terminals of both rows of passages, water inlet means leading into one tank and water outlet means leading into the remaining tank of said pair of tanks.

2. In the manufacture of cellular heat exchange cores, the method which comprises deforming a plurality of imperforate sheet metal ribbons into a generally zig-zag configuration defined by transverse crests and depressed portions terminating in marginal and medial offset portions extending longitudinally of said ribbons, positioning strips of solder on at least certain of the medial portions of said imperforate ribbons in close engagement therewith throughout the longitudinal extent of said ribbons, said solder strips being of such width as to cover said medial portions while leaving the depressed portions substantially uncovered, assembling said imperforate ribbons in pairs with the marginal portions of the ribbons in each pair abutting each other, the medial portions also abutting each other through said solder strips, and the depressed portions spaced from each other, positioning a plurality of pairs of said ribbon assemblies in parallel relation and interposing spacer ribbons between the exposed surfaces of the imperforate ribbons of adjacent pairs thereby to form a cellular core assembly, holding the parts of said assembly together, dipping the marginal portions of said ribbons into a bath of molten solder to integrate such marginal portions to each other and to said spacer ribbons, and simultaneously melting the solder strips between said marginal portions by the sensible heat of the solder bath to integrate said medial portions.

3. A heat exchange radiator comprising a cellular core, said core comprising a plurality of pairs of juxtaposed imperforate ribbons of generally zig-zag configuration defined by transverse crests having marginal and medial offset portions contiguous with depressed portions, the ribbons in each pair being disposed with their marginal and medial portions abutting each other and the depressed portions in spaced relation, one marginal portion and one medial portion of the ribbons in each pair cooperating, with the depressed portions contiguous therewith, to define a water passage extending longitudinally of the core, the other marginal portions with their contiguous depressed and medial portions also defining a longitudinal water passage parallel°to said first named passage, thereby providing rows of water passages in each pair of ribbons from face to face of the core, spacer ribbons interposed between the exposed surfaces of the imperforate ribbons of adjacent pairs to space said water passages and to provide air passages extending transversely of the rows of water passages and from face to face of the core, whereby air flowing from face to face of said core engages first one and then another of the passages in said rows, a common header for said rows at one end of the core, and separate headers at the other end of the core for each of said rows of water passages, whereby water flowing through the radiator flows in series order through the passages of one row and then the other row, and air flowing transversely of the radiator contacts said rows in series.

4. A heat exchange radiator as set forth in the immediately preceding claim, wherein both the marginal and medial abutting portions of the imperforate ribbons of said pairs are integrated to each other.

5. A heat exchange radiator comprising a cellular core having a common header at one end and a plurality of headers at the other end, said core comprising a plurality of pairs of juxtaposed deformed imperforate sheet metal ribbons of generally zig-zag configuration defined by transverse crests and depressed portions terminating in marginal and medial offset portions extending longitudinally of said ribbons, the marginal and medial portions of the ribbons in each pair abutting each other and the depressed portions intermediate each marginal portion and its contiguous medial portion being spaced, thereby to provide a plurality of rows of passages between each pair of juxtaposed ribbons extending from end to end of the core, said pairs of juxtaposed ribbons in said core being substantially parallel to each other, spacer ribbons interposed between the exposed surfaces of the imperforate ribbons of adjacent pairs to space said rows of water passages and to provide air passages from face to face of the core, the common header at one end of the core covering the water passages of a plurality of rows and the headers at the other end covering the water passages of each row, thereby to provide a series circuit for the flow of water through the rows of passages in which the rows are successively contacted by air flowing from face to face of the core, means consisting of fused strip solder for integrating the imperforate ribbons at their abutting medial portions only, and means consisting of molten bath solder for integrating the marginal portions of the imperforate ribbons and the adjacent portions of the interposed spacer ribbons.

STANISLAUS PRZYBOROWSKI.